United States Patent [19]
Maeda et al.

[11] Patent Number: 5,331,650
[45] Date of Patent: Jul. 19, 1994

[54] LIGHT SOURCE DEVICE AND OPTICAL PICKUP USING LIGHT SOURCE DEVICE

[75] Inventors: Hideo Maeda; Kazuya Miyagaki, both of Yokohama, Japan

[73] Assignee: Ricoh Company, Ltd., Tokyo, Japan

[21] Appl. No.: 849,954

[22] Filed: Mar. 12, 1992

[30] Foreign Application Priority Data

Mar. 20, 1991 [JP] Japan ................................. 3-081420
Mar. 20, 1991 [JP] Japan ................................. 3-081421

[51] Int. Cl.$^5$ ............................................. H01S 3/10
[52] U.S. Cl. ..................... 372/26; 359/328; 369/44.12; 372/22; 372/23
[58] Field of Search ............. 372/21, 22, 23, 26, 372/92; 369/44.12; 359/328

[56] References Cited

U.S. PATENT DOCUMENTS 5,038,352  8/1991  Lenth et al. ................. 372/21
5,268,912 12/1993  Tatsuno et al. ............. 372/22

Primary Examiner—James W. Davie
Attorney, Agent, or Firm—Cooper & Dunham

[57] ABSTRACT

An SHG element has a semiconductor laser, and a laser resonator for exciting an oscillation line having a predetermined wavelength by making a light beam emitted from the semiconductor laser incident to the laser resonator. The laser resonator converts the wavelength on the oscillation line by a nonlinear optical crystal and emits SHG light having a converted wavelength. The laser resonator uses $Nd:YVO_4$ as a laser medium for exciting the oscillation line having the predetermined wavelength. The semiconductor laser emits a light beam having power required to obtain the SHG light having predetermined power from the laser resonator when $Nd:YVO_4$ is used as the laser medium of the laser resonator. A light source device has a semiconductor laser capable of directly modulating light; a wavelength converting section for emitting light having a short wavelength based on LD light from the semiconductor laser; and a device for superposing the LD light from the semiconductor laser on the light having a short wavelength to emit superposed light. An optical pickup uses this light source device.

12 Claims, 11 Drawing Sheets

BASIC WAVELENGTH (nm)

LIGHT SOURCE DEVICE AND OPTICAL PICKUP USING LIGHT SOURCE DEVICE

BACKGROUND OF THE INVENTION

1. Field of the Invention

The present invention relates to a second higher harmonic wave generating element (which is called an SHG element in the following description) used as a light source such as an optical pickup. The present invention also relates to a light source device for emitting a light beam and an optical pickup using this light source device.

2. Description of the Related Art

Recently, a compact and reliable blue light source having a long lifetime has been required. An SHG element attracts public attention as one approach to this requirement. This SHG element is provided by combining a semiconductor laser with a wavelength converting element.

For example, in a light source in an optical pickup for an optical disk, it is preferable to set the wavelength of an emitted light beam to be shorter so as to reduce the diameter of a converged light spot and increase a capacity of the optical disk. In the general SHG element, the light beam having a short wavelength of 473 nm is emitted as SHG light. Accordingly, the SHG element is considered to be suitable for a light source for the optical pickup. However, to increase the capacity of the optical disk, it is necessary to use an SHG element for emitting SHG light having a wavelength shorter than the wavelength of 473 nm.

The above general SHG element uses a Nd:YAG laser medium having an absorption band which is not so wide. Accordingly, it is necessary to strictly control temperature of the semiconductor laser by arranging a temperature controller to restrain a change in absorbing amount of the light beam and provide stable output characteristics of the semiconductor laser. Therefore, the SHG element is large-sized and cost thereof is increased.

In the general light source device, the semiconductor laser can directly emit LD light modulated at a high speed in the order of about several MHz by modulating a driving electric current of the semiconductor laser in the order of about several MHz at a high speed. However, a modulating frequency (or a modulating speed) of the Nd:YAG laser medium is limited and is of the order of about several KHz by its fluorescence lifetime. Accordingly, no solid laser such as Nd:YAG is modulated at a high speed in the order of several MHz even when the LD light modulated at a high speed in the order of several MHz is incident to the Nd:YAG laser medium from the semiconductor laser. The SHG light finally emitted from a Nd:YAG laser resonator is not changed to a light beam modulated at a high speed in the order of about several MHz, but is changed to a light beam modulated in the order of about several KHz.

Therefore, in the general light source device, the diameter of a converged light spot can be reduced, but no light beam modulated at a high speed can be emitted from the light source device.

SUMMARY OF THE INVENTION

It is therefore a first object of the present invention to provide an SHG element in which SHG light suitable for a light source of an optical pickup, etc. and having a shorter wavelength can be efficiently emitted and the stable output characteristics of a semiconductor laser can be obtained without requiring any strict temperature control thereof.

A second object of the present invention is to provide a light source device for reducing the diameter of a converged light spot and emitting a light beam modulated at a high speed, and provide an optical pickup using this light source device.

The above first object of the present invention can be achieved by an SHG element comprising a semiconductor laser; and a laser resonator for exciting an oscillation line having a predetermined wavelength by making a light beam emitted from the semiconductor laser incident to the laser resonator; the laser resonator converting the wavelength on the oscillation line by a nonlinear optical crystal and emitting SHG light having a converted wavelength; the laser resonator using Nd:YVO$_4$ as a laser medium for exciting the oscillation line having the predetermined wavelength; and the semiconductor laser emitting a light beam having power required to obtain the SHG light having predetermined power from the laser resonator when Nd:YVO$_4$ is used as the laser medium of the laser resonator.

The nonlinear optical crystal may be constructed by using a KNbO$_3$ crystal cut at cut angles $\theta = 90° \pm 1°$ and $\phi \approx 40.6° \pm 5°$, or cut angles $\theta \approx 63.8° \pm 5°$ and $\phi = 90° \pm 1°$.

Further, predetermined processing may be performed with respect to a light emitting face of the nonlinear optical crystal such that the light emitting face functions as a mirror for laser resonance.

In the above SHG element, a light beam is emitted from the semiconductor laser as a light source for excitation and is incident to the laser resonator to obtain SHG light therefrom. In the present invention, Nd:YVO$_4$ is used as a laser medium within the laser resonator so that an oscillation line having a wavelength about 914 nm can be excited. Accordingly, light having a short wavelength about 457 nm can be obtained as SHG light having a wavelength converted by the nonlinear optical crystal. In this case, the semiconductor laser emits a light beam having power required to obtain the SHG light having predetermined power from the laser resonator when Nd:YVO$_4$ is used as the laser medium of the laser resonator, thereby efficiently obtaining the SHG light.

The nonlinear optical crystal is constructed by using a KNbO$_3$ crystal cut at cut angles $\theta = 90° \pm 1°$ and $\phi \approx 40.6° \pm 5°$, or cut angles $\theta \approx 63.8° \pm 5°$ and $\phi = 90° \pm 1°$. In this case, the SHG light can be more efficiently obtained.

It is not necessary to separately dispose an output mirror if predetermined processing is performed with respect to a light emitting face of the nonlinear optical crystal such that this light emitting face functions as a mirror for laser resonance.

The above second object of the present invention can be achieved by a light source device comprising a semiconductor laser capable of directly modulating light; a wavelength converting section for emitting light having a short wavelength based on LD light from the semiconductor laser; and means for superposing the LD light from the semiconductor laser on the light having a short wavelength to emit superposed light.

The above second object of the present invention can be also achieved by an optical pickup using a light source device, the light source device comprising a semiconductor laser capable of directly modulating light; a wavelength converting section for emitting light having a short wavelength based on LD light from the semiconductor laser; and means for superposing the LD light from the semiconductor laser on the light having a short wavelength to emit superposed light; the optical pickup being constructed such that a light beam emitted from the light source device is converged and incident to an optical memory medium.

In the above light source device, LD light from the semiconductor laser is superposed on light having a short wavelength from the wavelength converting section and is emitted from the light source device. The semiconductor laser can directly modulate the LD light. Therefore, the semiconductor laser can emit the LD light modulated at a high speed. The modulated LD light is superposed on the light having a short wavelength. As a result, the light having a short wavelength can be apparently emitted as light modulated at a high speed without modulating this light having a short wavelength at a high speed. A portion of the superposed light having an intensity equal to or greater than a predetermined light intensity is provided by the light having a short wavelength. Accordingly, the diameter of a beam spot can be reduced even when the LD light is superposed on the light having a short wavelength.

When such a light source device is used for an optical pickup, data can be written to an optical memory medium at a high speed by apparently emitting the light having a short wavelength and modulated at a high speed from the light source device. Further, a capacity of the optical memory medium is increased by using a converged light spot having a small diameter.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an SHG element, a light source and an optical pickup using the light source in the present invention will next be described in detail with reference to the accompanying drawings.

Figure 1:
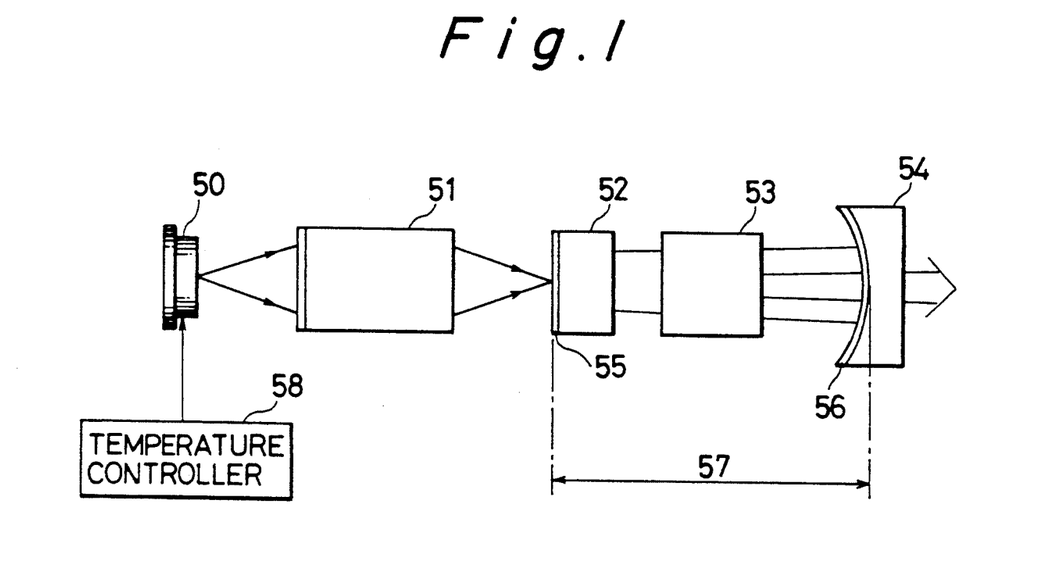
FIG. 1 is a view showing one example of the construction of a general SHG element.

FIG. 1 is a view showing the construction of a general SHG element. For example, such an SHG element is shown in a literature "LD-excited Nd:YAG blue laser" in a report RTM-90-39 of a research meeting of the Laser Society of Japan, pp. 19 to 23. In FIG. 1, this SHG element has a semiconductor laser 50 and a convergent optical system 51 for converging a light beam emitted from the semiconductor laser 50. The SHG element further has a Nd:YAG laser medium 52, a wavelength converting element 53 for the conversion of a second higher harmonic wave, and an output mirror 54.

Coating films 55 and 56 are respectively formed on a light incident face of the Nd:YAG laser medium 52 and a concave face of the output mirror 54. The coating films 55 and 56 are used to totally reflect light having a wavelength of 946 nm and restrain a parasitic oscillation. A structure between the light incident face of the Nd:YAG laser medium 52 and the coating film 56 on the output mirror 54 functions as a laser resonator 57. The semiconductor laser 50 functions as a light source for excitation of the laser resonator 57.

A wavelength of the light beam emitted from the semiconductor laser 50 is changed in accordance with temperature. The Nd:YAG laser medium 52 has an absorption band which is not so wide. Therefore, an absorbing amount of the light beam absorbed from the semiconductor laser 50 into the Nd:YAG laser medium 52 is changed in accordance with a change in temperature of the semiconductor laser 50. In the general SHG element, the temperature of the semiconductor laser 50 is controlled by using a temperature controller 58 to restrain the change in absorbing amount and obtain stable output characteristics of the semiconductor laser.

A $KNbO_3$ crystal as a nonlinear optical crystal is used in the wavelength converting element 53 within the laser resonator 57. When the KNbO$_3$ crystal is used as the wavelength converting element 53, phase matching can be performed at a basic wavelength of 946 nm in the cases of A-cut ($\theta=90°$, $\phi\approx60°$) and B-cut ($\theta\approx30°$, $\phi=90°$) from the relation between the basic wavelength and phase matching angles ($\theta$, $\phi$) shown in FIG. 2. In the above general SHG element, the B-cut is advantageous since a walk-off angle is small in the B-cut. Therefore, the KNbO$_3$ crystal is cut by using the B-cut.

In such an SHG element, the semiconductor laser 50 is operated and a laser beam emitted therefrom is incident to the Nd:YAG laser medium 52 through the convergent optical system 51. When the light beam from the semiconductor laser 50 is incident to the Nd:YAG laser medium 52, the light beam is absorbed into the Nd:YAG laser medium 52 and is used for pumping. Namely, an oscillation line at a wavelength of 946 nm is excited by pumping in a transition from $^4F_{3/2}$ of Nd:YAG to $^4I_{9/2}$ within the Nd:YAG laser medium 52. The excited light beam having the wavelength of 946 nm is converted to a light beam having a half wavelength of 473 nm by the wavelength converting element 53 and can be emitted as SHG light from the laser resonator 57.

For example, in a light source in an optical pickup for an optical disk, it is preferable to set the wavelength of the emitted light beam to be shorter so as to reduce the diameter of a converged light spot and increase a capacity of the optical disk. In the above SHG element, the light beam having a short wavelength of 473 nm is emitted as SHG light. Accordingly, the SHG element is considered to be suitable for a light source for the optical pickup. However, to increase the capacity of the optical disk, it is necessary to use an SHG element for emitting SHG light having a wavelength shorter than the wavelength of 473 nm.

The above general SHG element uses the Nd:YAG laser medium 52 having an absorption band which is not so wide. Accordingly, it is necessary to strictly control the temperature of the semiconductor laser 50 by arranging the temperature controller 58 to restrain a change in absorbing amount of the light beam and provide stable output characteristics of the semiconductor laser. Therefore, the SHG element is large-sized and cost thereof is increased.

Figure 3:
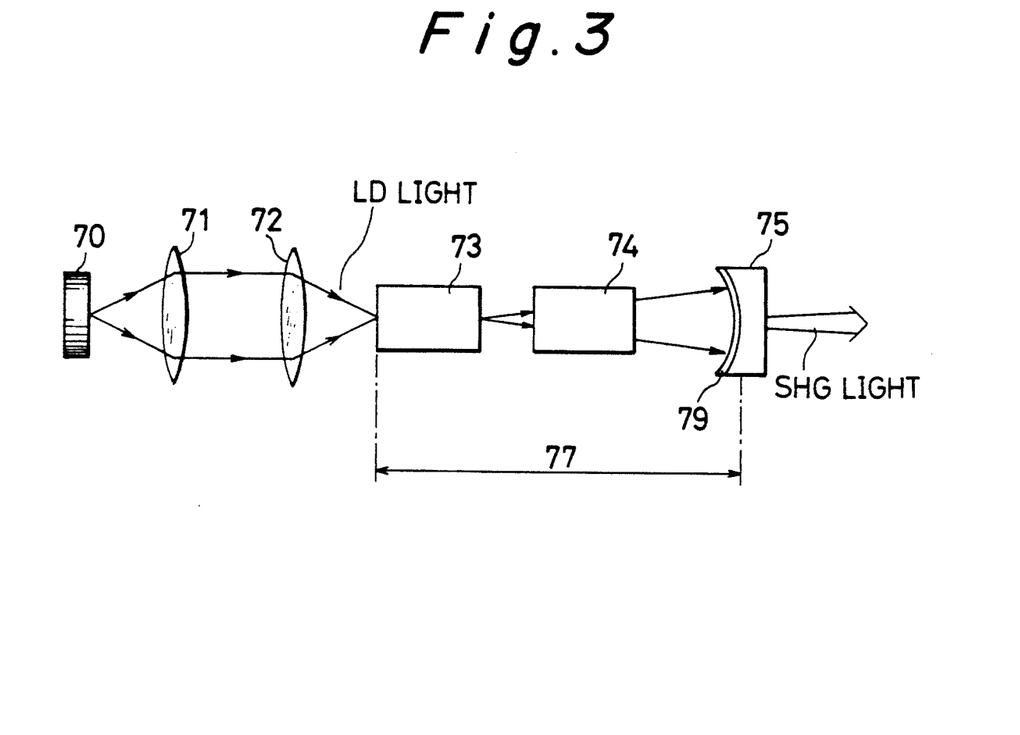
FIG. 3 is a view showing the construction of a general light source device for emitting SHG light.

FIG. 3 shows another SHG (second higher harmonic wave generating) element. For example, this SHG element is disclosed in a literature "Journal of Optical Society of America B Vol. 3, No. 9, pp. 1175 to 1179 in 1986". This SHG element has a semiconductor laser 70 for emitting a light beam (which is called LD light in the following description) having a wavelength about 808 nm, and has a collimator lens 71 for changing the light beam emitted from the semiconductor laser 70 to parallel light. The SHG element also has a condenser lens 72 for converging the LD light transmitted through the collimator lens 71. The SHG element further has a Nd:YAG laser medium 73, KTP 74 as a nonlinear optical crystal for the conversion of a second higher harmonic wave, and an output mirror 75. A structure between an end face of the Nd:YAG laser medium 73 on a side of the semiconductor laser 70 and the output mirror 75 functions as a Nd:YAG laser resonator 77. The semiconductor laser 70 functions as a light source for excitation with respect to the Nd:YAG laser resonator 77. More particularly, a predetermined coating film 79 is formed on a concave face of the output mirror 75. For example, this coating film 79 is constructed by a material having a high reflectivity with respect to light having a wavelength of 1064 nm on an oscillation line of Nd and having a low reflectivity with respect to light having a half wavelength of 532 nm. Accordingly, the coating film 79 functions as a mirror with respect to the light having a wavelength of 1064 nm. Thus, a Q-factor of the laser resonator 77 is high with respect to wavelength 1064 nm and is low with respect to the half wavelength 532 nm.

In the SHG element constructed above, LD light is emitted from the semiconductor laser 70 when the semiconductor laser 70 is operated. This LD light is incident to the Nd:YAG laser medium 73 through the collimator lens 71 and the condenser lens 72. The Nd:YAG laser medium 73 has an absorption wavelength about 808 nm. Accordingly, when the LD light having a wavelength about 808 nm is incident to the Nd:YAG laser medium 73, the incident LD light is absorbed into the Nd:YAG laser medium 73 and is used for pumping. Thus, light having a wavelength of 1064 nm on an oscillation line of Nd is excited within the Nd:YAG laser resonator 77. The excited light having a wavelength of 1064 nm is converted by KTP 74 to light having a half wavelength of 532 nm and is emitted as second higher harmonic wave generating light (SHG light) from the Nd:YAG laser resonator 77.

As mentioned above, the SHG element shown in FIG. 3 can be considered as a light source device for emitting the SHG light. In this case, the SHG light emitted from this light source device has a preferable beam quality and has a short wavelength of 532 nm. Accordingly, the SHG light can be converged by an objective lens until a limit of diffraction so that the diameter of a converged light spot can be reduced.

In the above general light source device, the semiconductor laser 70 can directly emit LD light modulated at a high speed in the order of about several MH$_z$ by modulating a driving electric current of the semiconductor laser in the order of about several MH$_z$ at a high speed. However, a modulating frequency (or a modulating speed) of the Nd:YAG laser medium 73 composed of a solid laser medium is limited and is of the order of about several KH$_z$ by its fluorescence lifetime of several hundred μ seconds. Accordingly, no solid laser such as Nd:YAG is modulated at a high speed in the order of several MH$_z$ even when the LD light modulated at a high speed in the order of several MH$_z$ is incident to the Nd:YAG laser medium 73 from the semiconductor laser 70. The SHG light finally emitted from the Nd:YAG laser resonator 77 is not changed to a light beam modulated at a high speed in the order of about several MH$_z$, but is changed to a light beam modulated in the order of about several KH$_z$.

Therefore, in the general light source device as shown in FIG. 3, the diameter of a converged light spot can be reduced, but no light beam modulated at a high speed can be emitted from the light source device.

Figure 4:
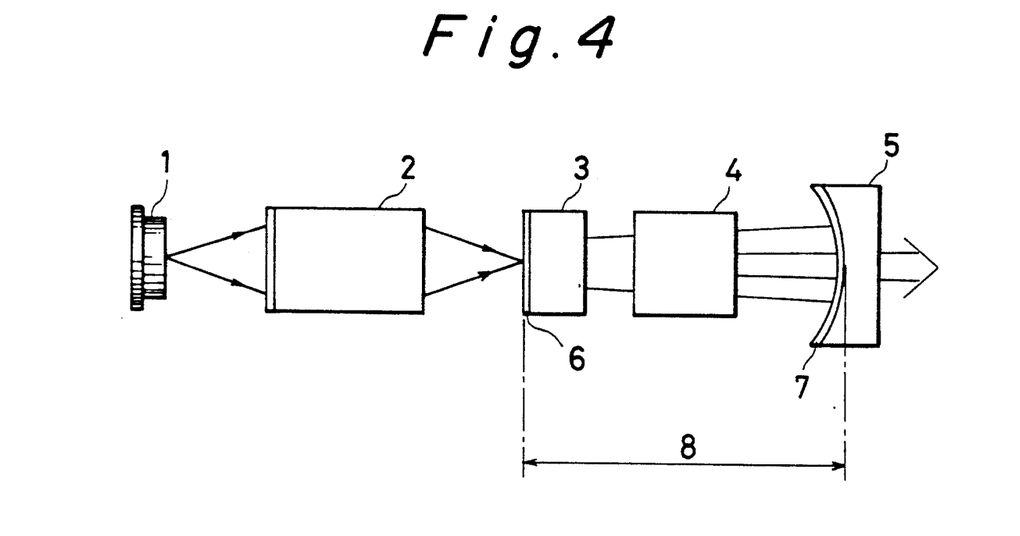
FIG. 4 is a view showing the construction of an SHG element in accordance with one embodiment of the present invention.

FIG. 4 is a view showing the construction of a second higher harmonic wave generating element (which is called an SHG element in the following description) in accordance with one embodiment of the present invention. As shown in FIG. 4, the SHG element in this embodiment has a semiconductor laser 1 having high power and a convergent optical system 2 for converging a light beam emitted from the semiconductor laser 1. The SHG element further has a Nd:YVO$_4$ laser medium 3, a wavelength converting element 4 for the conversion of a second higher harmonic wave, and an output mirror 5.

Predetermined coating films 6 and 7 are respectively formed on a light incident face of the Nd:YVO$_4$ laser medium 3 and a concave face of the output mirror 5. A structure between the light incident face of the Nd:YVO$_4$ laser medium 3 and the concave face of the output mirror 5 functions as a laser resonator 8. A KNbO$_3$ crystal as a nonlinear optical crystal is used in the wavelength converting element 4.

Figure 5:
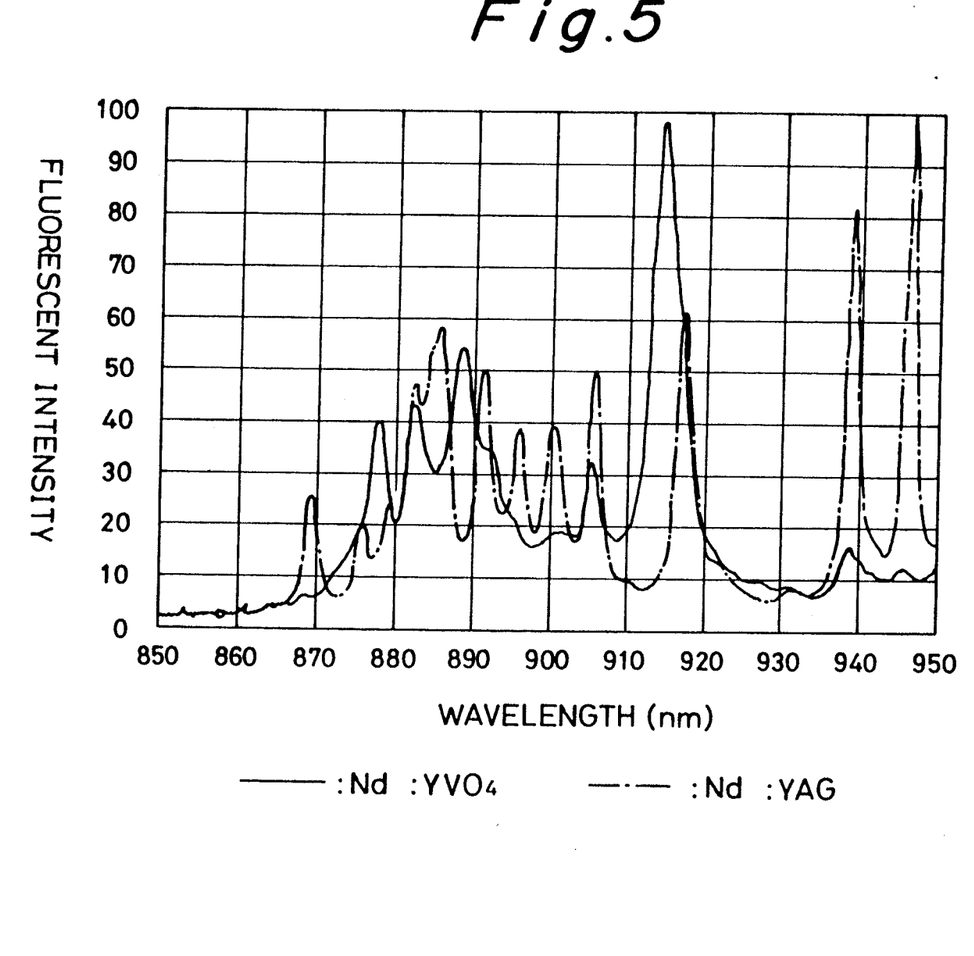
FIG. 5 is a graph showing light intensity distributions of $Nd:YVO_4$ and Nd:YAG at a wavelength close to 900 nm.
Figure 6:
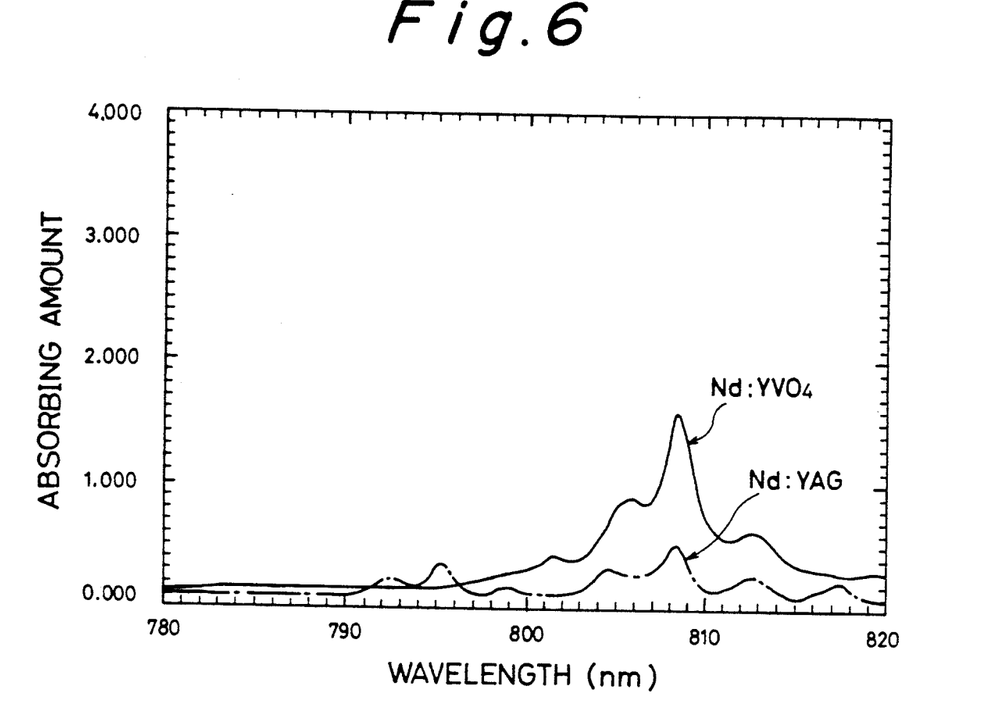
FIG. 6 is a graph showing absorption spectra of $Nd:YVO_4$ and Nd:YAG.

As can be seen from the comparison of FIGS. 4 and 1, in this embodiment, Nd:YVO$_4$ is used as a laser medium instead of Nd:YAG. Nd:YVO$_4$ generally has an oscillation line of 914 nm in a band of 900 nm in addition to an intense oscillation line in a band of 1000 nm. FIG. 5 is a graph of light intensity distributions showing fluorescent characteristics of Nd:YVO$_4$ and Nd:YAG at a wavelength close to 900 nm. FIG. 6 is a graph showing absorption spectra of Nd:YVO$_4$ and Nd:YAG. As can be seen from FIG. 5, a light intensity of Nd:YVO$_4$ with respect to fluorescence at a wavelength close to 914 nm is comparable to that of Nd:YAG with respect to fluorescence at a wavelength of 946 nm. Accordingly, an intense laser oscillation can be expected at the wavelength close to 914 nm. As can be seen from FIG. 6, the light beam from the semiconductor laser 1 in the case of Nd:YVO$_4$ can be absorbed about three times that in the case of Nd:YAG. Further, the width of an absorption band of Nd:YVO$_4$ is about twice that of Nd:YAG.

When Nd:YVO$_4$ having such fluorescent characteristics is used as a laser medium instead of Nd:YAG, it can be expected that a light beam having a wavelength close to 914 nm and obtained by the Nd:YVO$_4$ laser medium 3 is converted to a light beam having a half wavelength of 457 nm by the wavelength converting element 4 and is emitted as SHG light from the laser resonator 8. The coating film 6 formed on the light incident face of the Nd:YVO$_4$ laser medium 3 has optical characteristics in which a large portion of the light beam having a wavelength close to 914 nm is reflected on the coating film 6 and a large portion of the light beam of the semiconductor laser 1 having a wavelength close to e.g., 810 nm is transmitted through the coating film 6. These optical characteristics are used to efficiently oscillate only light having a wavelength close to 914 nm in the laser resonator 8.

The coating film 7 formed on the concave face of the output mirror 5 has optical characteristics in which a large portion of the light beam having a wavelength close to 914 nm is reflected on the coating film 7 and a large portion of SHG light having a wavelength close to 457 nm is transmitted through the coating film 7. Further, these optical characteristics of the coating film 7 are set such that a large portion of the light beam having a wavelength close to 1060 nm is transmitted through the coating film 7 to restrain light reflection and a parasitic oscillation. When the coating films 6 and 7 respectively having the above optical characteristics are used, a Q-factor of the laser resonator 8 is high at a wavelength close to 914 nm and is very low in a wavelength band of 1000 nm. Thus, only light having a wavelength close to 914 nm is efficiently oscillated.

Figure 2:
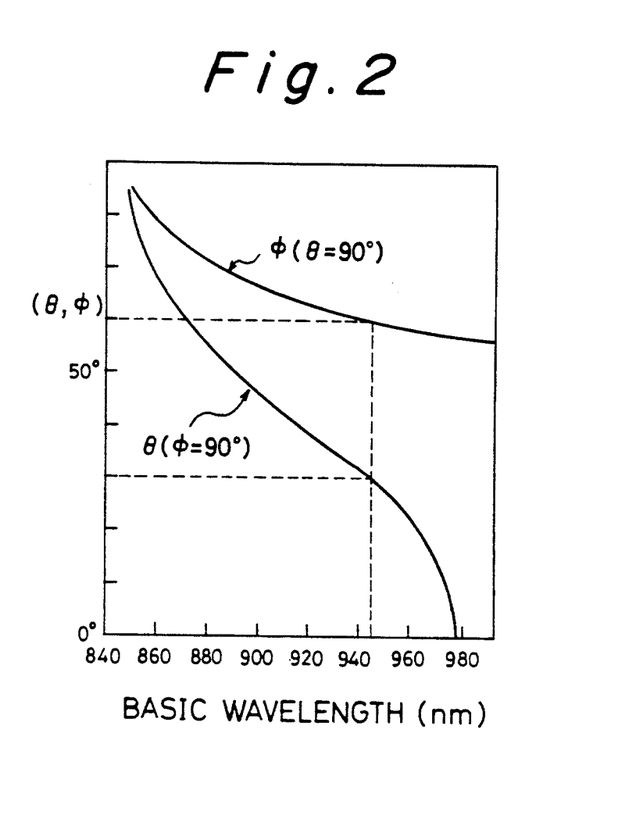
FIG. 2 is a graph showing the relation between a basic wavelength and phase matching angles in $KNbO_3$ crystal.
Figure 7:
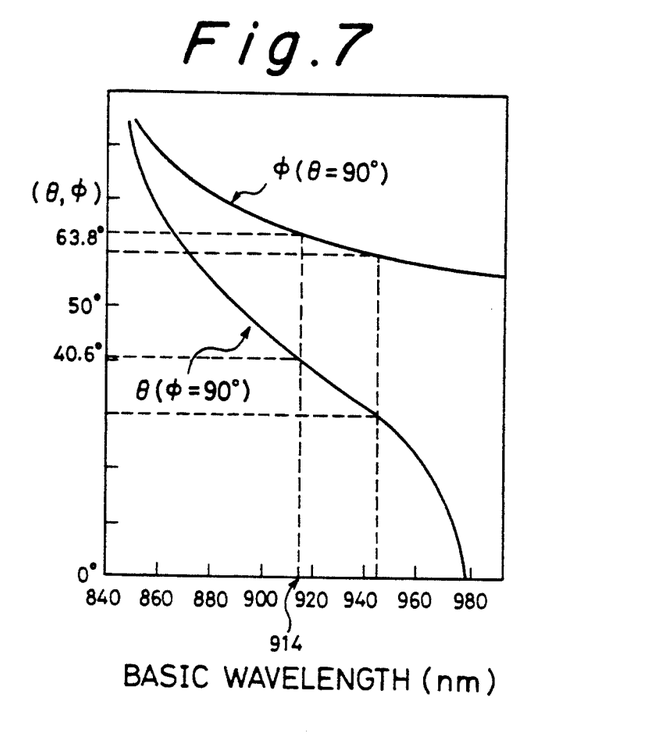
FIG. 7 is a graph showing the relation between a basic wavelength and phase matching angles in $KNbO_3$ crystal.

When a KNbO$_3$ crystal is used as the wavelength converting element 4 and a basic wavelength of 914 nm is used, phase matching can be performed at $\phi \approx 40.6°$ when $\theta = 90°$ and at $\theta \approx 63.8°$ when $\phi = 90°$ from the relation between the basic wavelength and phase matching angles $(\theta, \phi)$ shown in FIG. 7 and similar to that shown in FIG. 2. Accordingly, the KNbO$_3$ crystal constituting the wavelength converting element 4 is suitably cut at angles $(\theta = 90°, \phi \approx 40.6°)$ or $(\theta \approx 63.8°, \phi = 90°)$ to perform the phase matching at the basic wavelength of 914 nm and efficiently provide the SHG light having a wavelength of 457 nm. The cut KNbO$_3$ crystal is then set and used in a direction conforming to a polarizing direction of Nd:YVO$_4$.

In the SHG element having the above construction, the semiconductor laser 1 having high power is operated and a light beam emitted therefrom is incident to the Nd:YVO$_4$ laser medium 3 through the convergent optical system 2. When the light beam emitted from the semiconductor laser 1 is incident to the Nd:YVO$_4$ laser medium 3, the incident light beam is absorbed into the Nd:YVO$_4$ laser medium 3 and is used for pumping. Namely, an oscillation line at a wavelength of 914 nm is excited by pumping within the Nd:YVO$_4$ laser medium 3. The excited light beam having wavelength 914 nm is converted by the wavelength converting element 4 to a light beam having a half wavelength of 457 nm and can be emitted from the laser resonator 8.

Figure 8A:
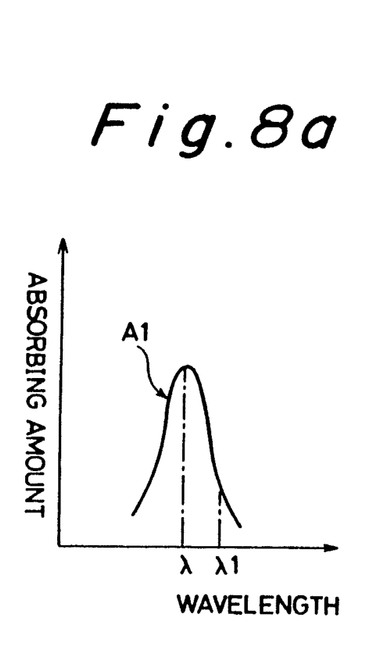
FIG. 8a is a graph showing an absorption band of a Nd:YAG laser medium.

In this case, the wavelength of the light beam emitted from the semiconductor laser 1 is changed in accordance with a change in temperature of the semiconductor laser. When Nd:YAG having an absorption band A1 not so wide as shown in FIG. 8$a$ is used as a laser medium, an absorbing amount of the light beam absorbed from the semiconductor laser into the Nd:YAG laser medium is greatly changed when the wavelength of the light beam emitted from the semiconductor laser is changed from $\lambda$ to $\lambda 1$ in accordance with the change in temperature thereof. Accordingly, it is impossible to obtain stable output characteristics of the semiconductor laser. When Nd:YAG is used as a laser medium as in the general SHG element, it is necessary to constantly hold the temperature of the semiconductor laser by a temperature controller at any time to obtain the stable output characteristics such that the change in wavelength of the light beam emitted from the semiconductor laser is restrained.

Figure 8B:
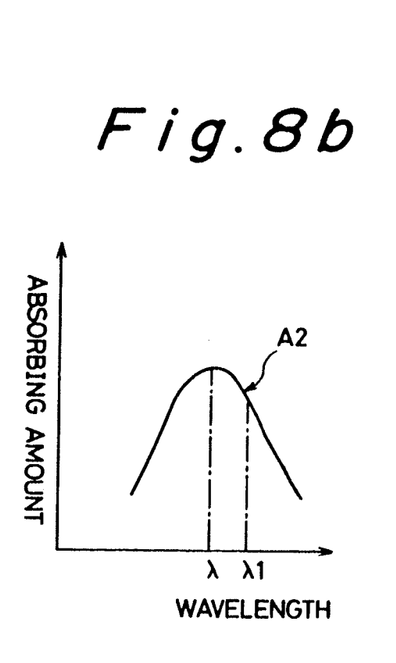
FIG. 8b is a graph showing an absorption band of a $Nd:YVO_4$ laser medium.

In contrast to this, in this embodiment, as shown in FIG. 8$b$, the width of an absorption band A2 of Nd:YVO$_4$ is about twice that of Nd:YAG and this Nd:YVO$_4$ is used as a laser medium. Accordingly, no absorbing amount of the laser beam in the Nd:YVO$_4$ laser medium 3 is greatly changed even when the wavelength of the laser beam emitted from the semiconductor laser 1 is changed from $\lambda$ to $\lambda 1$ in accordance with the change in temperature thereof. Therefore, it is possible to obtain stable output characteristics of the semiconductor laser without strictly controlling the temperature thereof.

Figure 9:
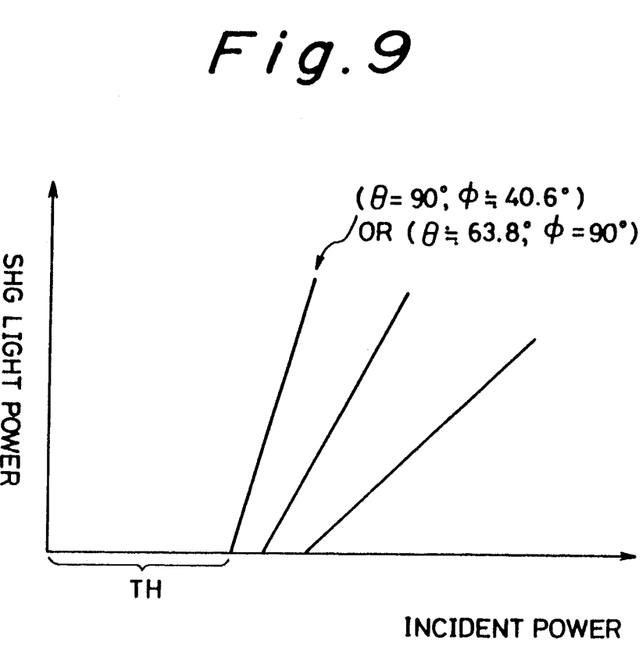
FIG. 9 is a graph showing the relation between the incident power of a light beam incident to a $Nd:YVO_4$ laser resonator from a semiconductor laser and the SHG power of SHG light emitted from the laser resonator.

The inventors of the present application found that the relation between incident power of the light beam incident from the semiconductor laser 1 to the Nd:YVO$_4$ laser resonator 8 and SHG power of SHG light emitted from the laser resonator 8 is provided as shown in FIG. 9 with cut angles $(\theta, \phi)$ of the KNbO$_3$ crystal as parameters. As can be seen from FIG. 9, a semiconductor laser 1 having light-emitting power greater than a threshold value TH is required to obtain predetermined SHG power. To obtain maximum SHG efficiency, it is preferable to set the respective cut angles $(\theta, \phi)$ of the KNbO$_3$ crystal as the wavelength converting element 4 to $(\theta = 90°, \phi \approx 40.6°)$ or $(\theta \approx 63.8°, \phi = 90°)$.

In this embodiment, the semiconductor laser 1 having high light-emitting power greater than the above threshold value TH is used. Further, the KNbO$_3$ crystal is used by cutting this crystal at the above cut angles ($\theta$, $\phi$). Accordingly, phase matching is performed at the wavelength of 914 nm and SHG light having a wavelength about 457 nm can be efficiently obtained. SHG converting efficiency can be further improved if a coating film is formed on both sides of the KNbO$_3$ crystal as the wavelength converting element 4 such that no light having each of wavelengths 1060 nm and 457 nm is reflected on this coating film. Further, the SHG light having a wavelength about 457 nm can be more efficiently obtained.

As mentioned above, in this embodiment, Nd:YVO$_4$ is used as a laser medium and the semiconductor laser 1 having high power is also used. Further, the KNbO$_3$ crystal as the wavelength converting element 4 is used by cutting this crystal at phase matching angles. Accordingly, SHG light having a wavelength of 457 nm shorter than that used in the general SHG element can be efficiently emitted from the semiconductor laser. When this SHG light is used for a light source of an optical pickup, etc., the diameter of a converged light spot can be set to be smaller and the capacity of an optical disk can be increased. Further, it is not necessary to control temperature of the semiconductor laser 1 so that the semiconductor laser 1 can be made compact and light in weight and cost thereof can be reduced.

Figure 10:
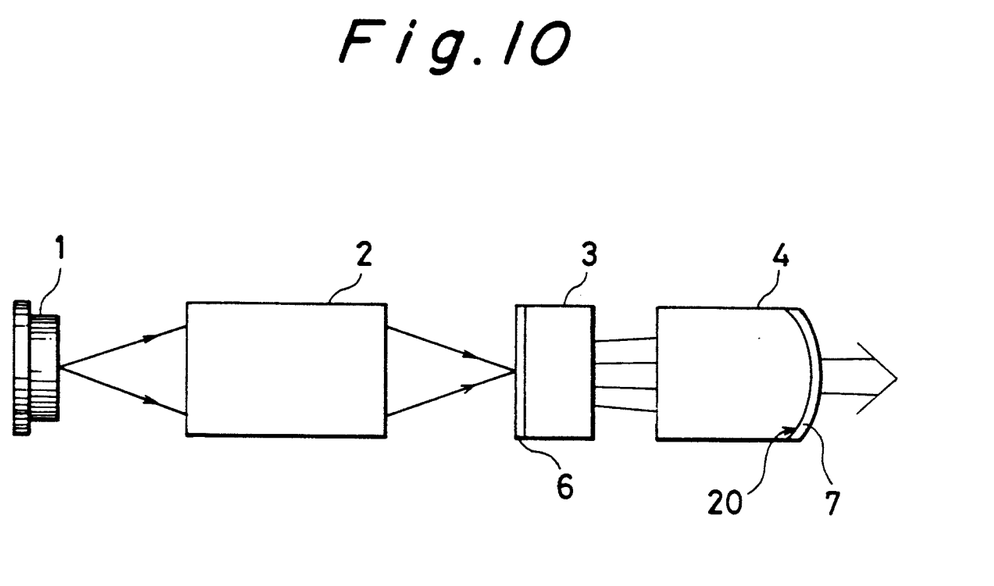
FIG. 10 is a view showing a modifying example of the SHG element shown in FIG. 4.
Figure 11:
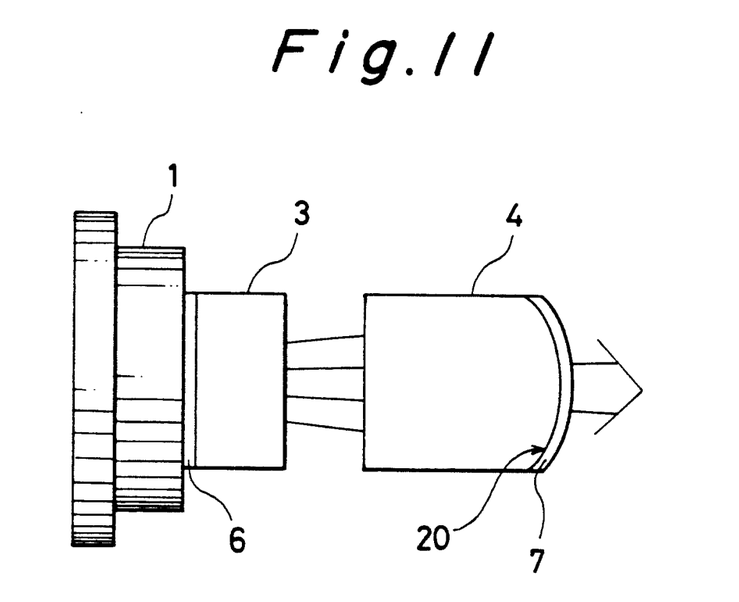
FIG. 11 is a view showing another modifying example of the SHG element shown in FIG. 4.

FIGS. 10 and 11 are views respectively showing modifying examples of the SHG element shown in FIG. 4. In the SHG element shown in FIG. 10, a light emitting face 20 of a KNbO$_3$ crystal 4 is processed and formed to be a concave face. A coating film similar to the coating film 7 formed on the concave face of the output mirror 5 shown in FIG. 4 is formed on this light emitting face 20. In this case, the light emitting face 20 of the KNbO$_3$ crystal 4 functions as an output mirror so that it is not necessary to separately dispose the output mirror 5 shown in FIG. 4. Accordingly, the SHG element can be made more compact and light in weight. In the SHG element shown in FIG. 11, a semiconductor laser 1 and a Nd:YVO$_4$ laser medium 3 are integrated with each other. In this case, no convergent optical system 2 shown in FIG. 4 is required and the SHG element can be made more compact and light in weight. The SHG element can be made further compact and light in weight by integrating the semiconductor laser 1, the Nd:YVO$_4$ laser medium 3 and the KNbO$_3$ crystal 4 with each other although this integral structure is not shown in the drawings.

In the above embodiment, in a certain case, a wavelength on an oscillation line is changed from 914 nm by several nm and the wavelength of SHG light emitted from the SHG element is slightly changed from 473 nm in accordance with a method for manufacturing the Nd:YVO$_4$ crystal and a slight difference between constructional composition ratios of this crystal. However, no effects of the present invention are substantially influenced by these changes. Further, no SHG efficiency is influenced so much and SHG light can be efficiently obtained even when phase matching angles are changed by several degrees. For example, no SHG efficiency is influenced so much and SHG light can be efficiently obtained even when the phase matching angles are set to 90° and are changed by ±1° and ±5°.

As mentioned above, in accordance with the present invention, Nd:YVO$_4$ is used as a laser medium within a laser resonator and a semiconductor laser having predetermined high power is used. Accordingly, it is possible to efficiently emit SHG light having a wavelength shorter than that used in the general SHG element. Further, it is possible to obtain stable output characteristics of the semiconductor laser without requiring any strict temperature control thereof.

Further, the SHG light can be more efficiently emitted by using a KNbO$_3$ crystal cut at cut angles ($\theta=90°\pm1°$, $\phi\approx40.6°\pm5°$) or ($\theta\approx63.8°\pm5°$, $\phi=90°\pm1°$) as a nonlinear optical crystal.

The SHG element can be made compact and light in weight if predetermined processing is performed with respect to a light emitting face of the nonlinear optical crystal such that this light emitting face functions as a mirror for laser resonance.

Figure 12:
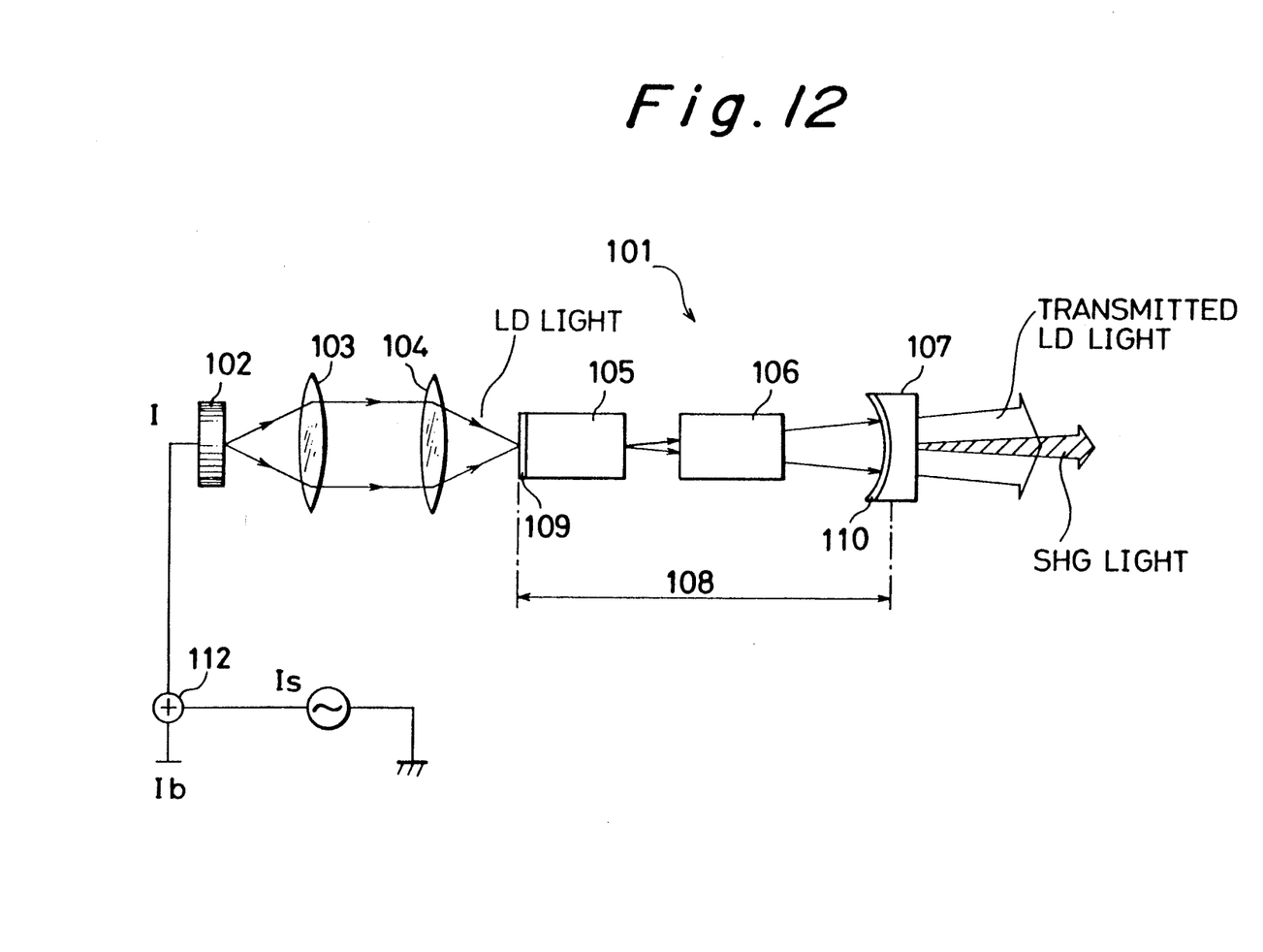
FIG. 12 is a view showing the construction of a light source device in accordance with another embodiment of the present invention.

FIG. 12 is a view showing the construction of a light source device in accordance with another embodiment of the present invention. In FIG. 12, a light source device 101 emits light having a short wavelength. For example, such a light source device is constructed by an SHG element for emitting second higher harmonic wave generating light as SHG light. In this embodiment, the light source device 101 has a semiconductor laser 102 for emitting a light beam (which is called LD light in the following description) having a wavelength about 808 nm, and has a collimator lens 103 for changing the light beam emitted from the semiconductor laser 102 to parallel light. The light source device 101 also has a condenser lens 104 for converging the LD light transmitted through the collimator lens 103. The light source device 101 further has a Nd:YAG laser medium 105, KTP 106 as a nonlinear optical crystal for the conversion of a second higher harmonic wave, and an output mirror 107. The KTP 106 is made of KT$_i$OPO$_4$. A structure between an end face of the Nd:YAG laser medium 105 on a side of the semiconductor laser 102 and the output mirror 107 functions as a Nd:YAG laser resonator 108. The semiconductor laser 102 functions as a light source for excitation with respect to the Nd:YAG laser resonator 108.

More particularly, predetermined coating films 109 and 110 are respectively formed on the end face of the Nd:YAG laser medium 105 and a concave face of the output mirror 107. For example, each of the coating films 109 and 110 is constructed by a material having a high reflectivity with respect to light having a wavelength of 1064 nm on an oscillation line of Nd and having a low reflectivity with respect to light having a half wavelength of 532 nm. Accordingly, each of the coating films 109 and 110 functions as a mirror with respect to light having a wavelength of 1064 nm. Thus, a Q-factor of the laser resonator 108 is high with respect to wavelength 1064 nm and is low with respect to the half wavelength 532 nm.

In this embodiment, the coating film 109 formed on the end face of the Nd:YAG laser medium 105 is constructed by a transmittable material such that the LD light can be transmitted through the coating film 109 so as to sufficiently emit and absorb the LD light from the semiconductor laser 102 into the Nd:YAG laser medium 105. The coating film 110 formed on the concave face of the output mirror 107 is constructed by a transmittable material such that a portion of the LD light transmitted through the Nd:YAG laser medium 105 and the KTP 106 can be transmitted through the coating film 110. This portion of the LD light is called transmitted LD light in the following description. Light having a wavelength close to 532 nm is substantially transmitted through the coating film 110 and the transmitted LD light can be further transmitted through the coating film 110. Thus, in this embodiment, SHG light having a wavelength close to 532 nm and emitted from the SHG element 101 is superposed on the transmitted LD light, thereby emitting superposed light from the laser resonator 108.

In this embodiment, a bias electric current Ib and an electric current Is for modulation are used as a driving electric current of the semiconductor laser 102. Namely, the driving electric current I of the semiconductor laser 102 is provided by adding the bias electric current Ib and the electric current Is for modulation to each other by an adder 112.

An operation of the light source device 101 constructed above will next be described. The semiconductor laser 102 is operated by the driving electric current I provided by adding the bias electric current Ib and the electric current Is for modulation. Thus, the semiconductor laser 102 emits LD light having a wavelength close to 808 nm in accordance with the driving electric current I. This LD light is incident to the Nd:YAG laser medium 105 through the collimator lens 103 and the condenser lens 104. A large portion of the incident LD light is absorbed into the Nd:YAG laser medium 105 and is used for pumping. Thus, light having a wavelength of 1064 nm on an oscillation line of Nd is excited within the Nd:YAG laser resonator 108. The excited light having wavelength 1064 nm is converted by the KTP 106 to light having a half wavelength of 532 nm and is emitted as SHG light from the Nd:YAG laser resonator 108. As mentioned above, a large portion of the LD light emitted from the semiconductor laser 102 is absorbed into the Nd:YAG laser medium 105. However, a portion of this LD light is not absorbed into the Nd:YAG laser medium 105, but is transmitted through the Nd:YAG laser medium 105. This transmitted portion of the LD light is further transmitted through the KTP 106 and the coating film 110 and is then emitted as transmitted LD light from the Nd:YAG laser resonator 108.

As a result, the SHG light emitted from the Nd:YAG laser resonator 108 is superposed on the transmitted LD light and superposed light is emitted as a light beam from the light source device 101.

Figure 13A:
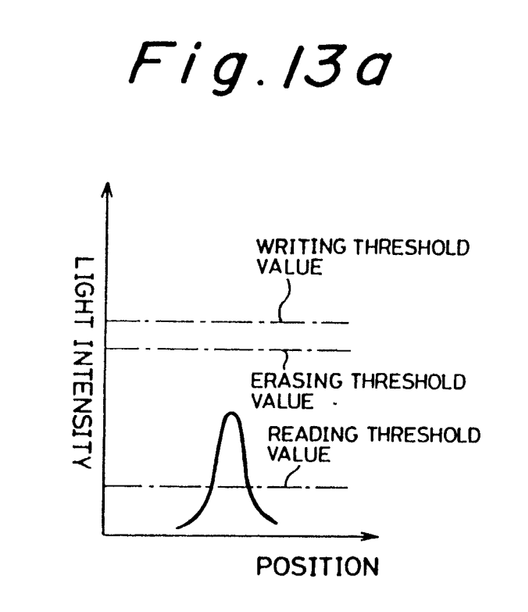
FIGS. 13a, 13b and 13c are graphs respectively showing spatial intensity distributions of SHG light, transmitted LD light and superposed light when an electric current value for modulation is set to zero after a bias electric current value is set to a predetermined value.
Figure 13B:
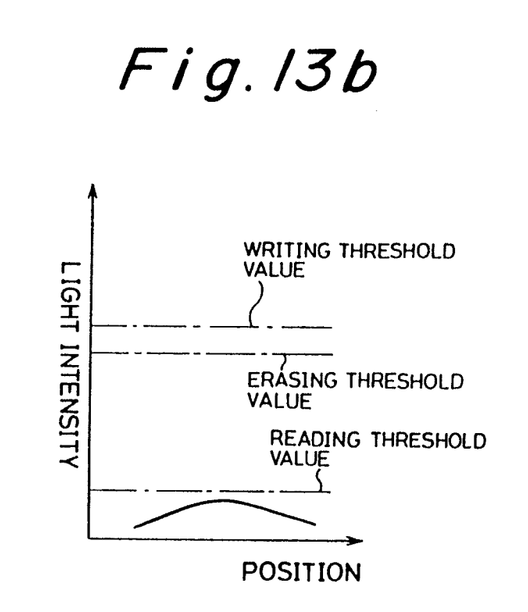
Figure 13C:
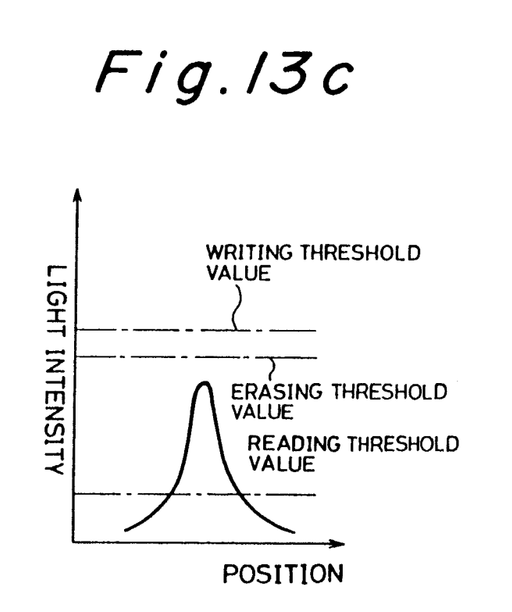
Figure 14A:
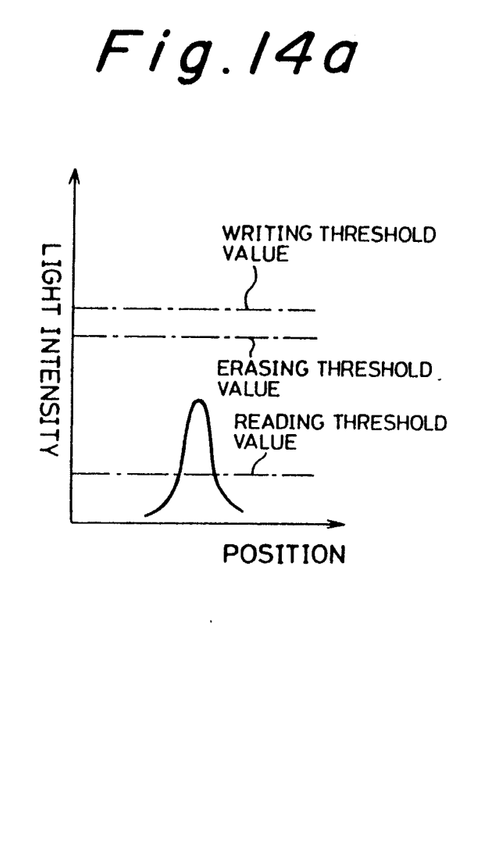
FIGS. 14a, 14b and 14c are graphs respectively showing spatial intensity distributions of the SHG light, the transmitted LD light and the superposed light when the electric current value for modulation is set to a maximum value after the bias electric current value is set to a predetermined value.
Figure 14B:
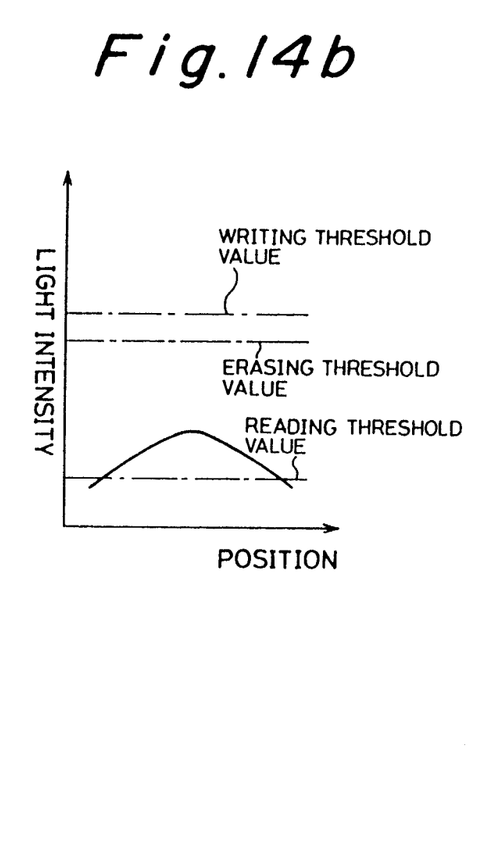
Figure 14C:
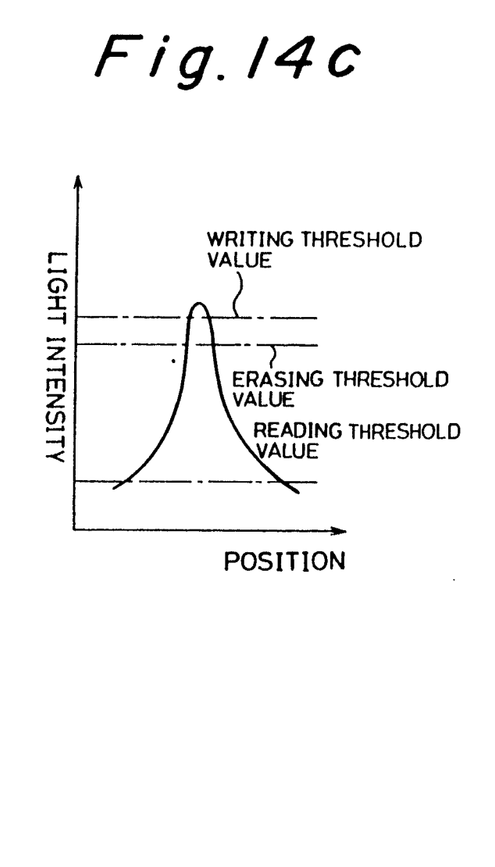

FIGS. 13a, 13b and 13c are graphs respectively showing spatial intensity distributions of the SHG light, the transmitted LD light and the superposed light when a value of the electric current Is for modulation is set to zero after a value of the bias electric current Ib is set to a predetermined value. FIGS. 14a, 14b and 14c are graphs respectively showing spatial intensity distributions of the SHG light, the transmitted LD light and the superposed light when the value of the electric current Is for modulation is set to a maximum value after the value of the bias electric current Ib is set to a predetermined value. In the spatial intensity distributions shown in FIGS. 13a to 13c and FIGS. 14a to 14c, the SHG light, the transmitted LD light and the superposed light are provided by stopping down an objective lens.

As mentioned above, the semiconductor laser 102 can directly emit LD light modulated at a high speed in the order of several MHz by modulating the driving electric current I in the order of several MHz at a high speed. In this case, transmitted LD light is also modulated at a high speed in the order of several MHz and is emitted. In contrast to this, no SHG light can be modulated in accordance with the modulation of the LD light even when the LD light is modulated at a high speed in the order of several MHz. Namely, the SHG light is changed to a light beam modulated in the order of about several KHz. Accordingly, when the electric current Is for modulation is modulated at a high speed in the order of several MHz, intensity of the superposed light is modulated by mainly modulating the transmitted LD light since intensity of the SHG light is considered to be almost constant irrespective of a change in time from FIGS. 13a to 13c and 14a to 14c. In other words, in this embodiment, the transmitted LD light is used as bias light and is modulated at a high speed by changing the electric current Is for modulation in the order of several MHz. Thus, it is possible to obtain effects similar to those provided by apparently modulating the SHG light at a high speed in the order of several MHz.

A beam diameter of the transmitted LD light is larger than that of the SHG light when the objective lens is stopped down to provide the superposed light such that the SHG light has a beam diameter in a limit of diffraction. As can be seen from FIG. 13c or 14c, a beam diameter of the superposed light having an intensity equal to or greater than a predetermined light intensity is approximately equal to the beam diameter of the SHG light in the limit of diffraction. Namely, a portion of the superposed light having an intensity equal to or greater than the predetermined light intensity is provided by the SHG light. Accordingly, no diameter of a converged light spot is increased so much in comparison with that provided by only the SHG light even when the transmitted LD light is superposed on the SHG light, thereby maintaining a sufficiently small diameter of the converged light spot.

Figure 15:
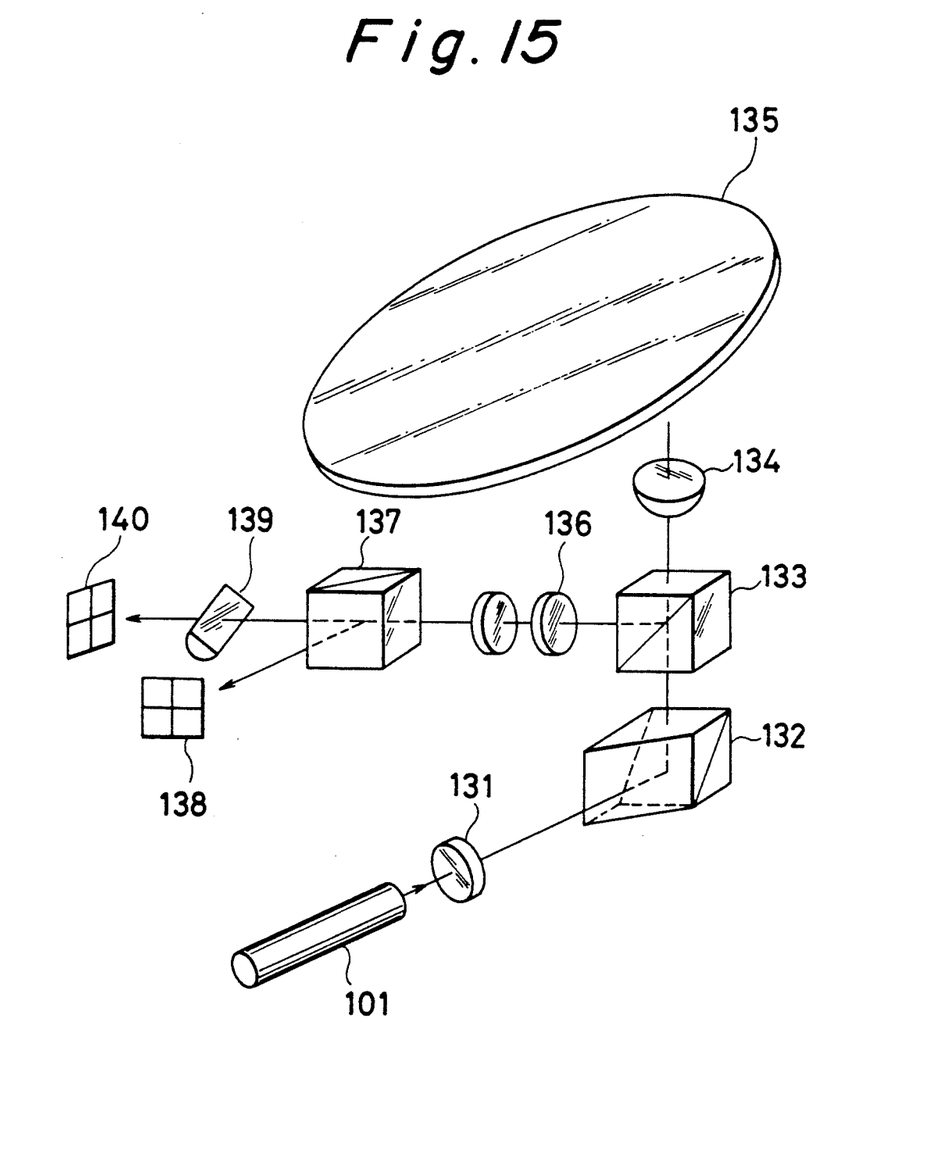
FIG. 15 is a view showing an example of the construction of an optical pickup using the light source device shown in FIG. 12.

FIG. 15 is a view showing an example of an optical pickup using the light source device 101 shown in FIG. 12. In the optical pickup shown in FIG. 15, superposed light is emitted from a light source device 101. The superposed light is then transmitted to an objective lens 134 through a collimator lens 131, a prism 132 and a beam splitter 133. The objective lens 134 is stopped down until a limit of diffraction so that the superposed light is incident onto an optical memory medium 135 as a light beam for writing, erasing or reading memory information. For example, the optical memory medium 135 is constructed by a magnetooptic disk, a phase change optical disk, a write-once laser disk, a compact disk, etc. Light reflected on the optical memory medium 135 is transmitted to a tracking detector 138 from the beam splitter 133 through a ¼ wavelength plate 136 and a polarizing beam splitter 137. The reflected light is also incident to a focusing detector 140 through a cylindrical lens 139. In this embodiment, an astigmatic method using the cylindrical lens 139 is shown to detect a focusing state of light.

The present invention uses that there exist threshold values of light intensity for reading, writing and erasing memory information from the optical memory medium 135 when the light source device 101 is used in the optical pickup.

Figure 16:
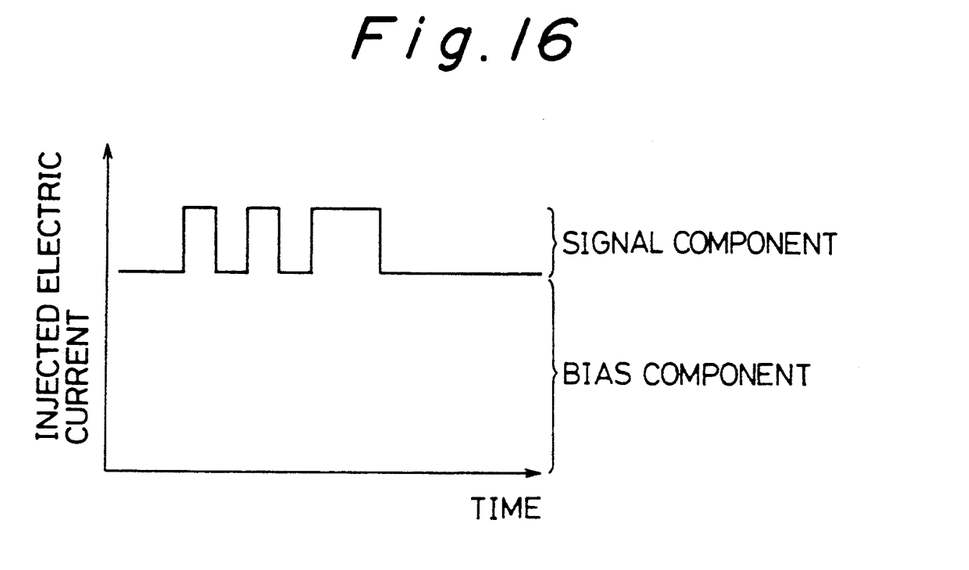
FIG. 16 is a view for explaining an electric current injected into a semiconductor laser.

For example, when data "01010110000" at a logic level are written to the optical memory medium 135, data "01010110000" are transmitted to the light source device 101 as a write signal. The light source device 101 generates an electric current Is for modulation in accordance with this write signal so as to superpose a signal component of an electric current injected into the semiconductor laser 102 on a bias electric current component as shown in FIG. 16. A bias electric current Ib is added to the electric current Is for modulation. In this case, a level of the bias electric current Ib is set such that the intensity of superposed light is equal to or smaller than a writing threshold value as a writing power intensity of the optical memory medium 135 when the write signal shows value "0". Namely, the level of the bias electric current Ib is set to show value "0" at a logic level. Further, a level of the electric current Is for modulation is set such that the intensity of superposed light is equal to or greater than the writing power intensity of the optical memory medium 135 when the write signal shows value "1". Namely, the level of the electric current Is for modulation is set to show value "1" at a logic level. If necessary, the level of the electric current Is for modulation may be amplified.

Figure 17:
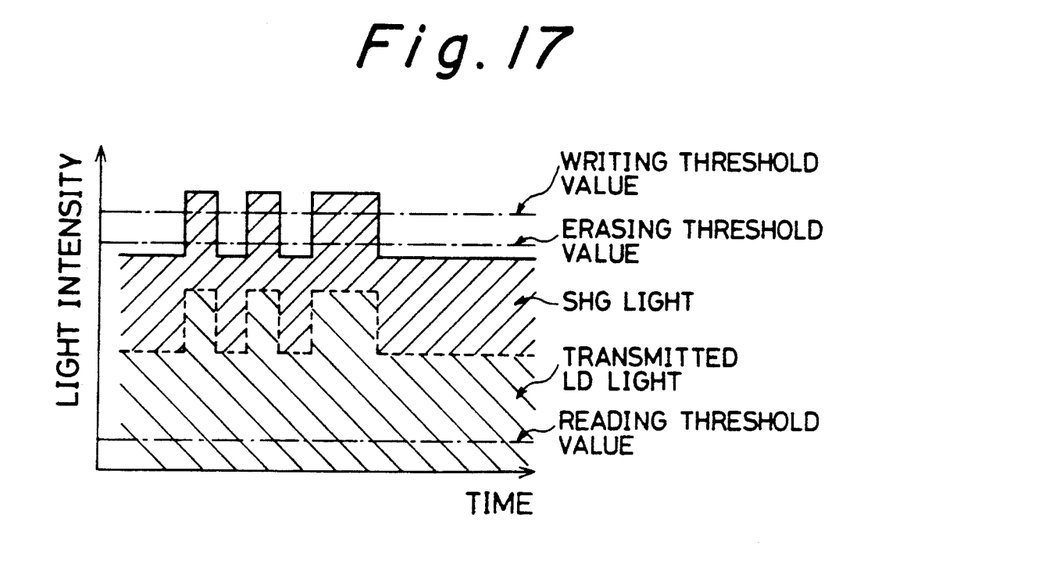
FIG. 17 is a view showing the intensity of a light beam emitted from the light source device shown in FIG. 12 on the basis of the injected electric current shown in FIG. 16.

The levels of the bias electric current Ib and the electric current Is for modulation are set in advance as mentioned above to perform a writing operation of information. When data "01010110000" are sequentially transmitted to the light source device 101 as a write signal, an electric current injected into the semiconductor laser 102 is provided as shown in FIG. 16. The light source device 101 emits superposed light having a light intensity as shown in FIG. 17 on the basis of this injected electric current. FIG. 17 shows an intensity of the superposed light when the write signal has a frequency in the order of several MHz. As mentioned above, no SHG light is modulated at a high speed in the order of several MHz so that the SHG light approximately has a constant intensity.

In contrast to this, transmitted LD light is modulated at a high speed in the order of several MHz. This transmitted LD light is superposed on the SHG light so that the SHG light can be apparently modulated at a high speed. Thus, write data "01010110000" can be correctly written to the optical memory medium 135. Namely, for example, when write signals indicative of "0" are continuously transmitted and a write signal indicative of "1" is momentarily transmitted and write signals indicative of "0" are then transmitted continuously, the general light source device as shown in FIG. 3 cannot follow this modulation at a high speed. Therefore, no SHG light is emitted from this light source device so that no write data "1" can be correctly written to the optical memory medium. However, in this embodiment, it is possible to correctly write the write data "1" to the optical memory medium 135. In contrast to the above case, when write signals indicative of "1" are continuously transmitted and a write signal indicative of "0" is momentarily transmitted and write signals indicative of "1" are then transmitted continuously, no write data "0" can be correctly written to the optical memory medium when the general light source device is used. However, in this embodiment, it is possible to correctly write the write data "0" to the optical memory medium 135.

In a general optical pickup, no SHG light modulated at a high speed can be obtained when an SHG element for providing a converged light spot having a small diameter is used for a light source to increase a capacity of the optical memory medium 135. Accordingly, it is impossible to realize an optical pickup for increasing the capacity of the optical memory medium 135 and having a high transfer rate. However, as mentioned above, when the light source device 101 in this embodiment is used, the capacity of the optical memory medium can be increased by using a converged light spot having a small diameter. Further, write data can be correctly written to the optical memory medium 135 at a high speed. Therefore, it is possible to realize an optical pickup for increasing the capacity of an optical disk, etc. and having a high transfer rate.

In the above embodiment, a Nd:YAG laser medium is used in the light source device 101, i.e., the SHG element. However, a Nd:YVO$_4$ laser medium can be used in the SHG element. In this case, it is possible to generate SHG light having a shorter wavelength about 457 nm so that the diameter of a converged light spot can be further reduced. At this time, it is preferable to use the semiconductor laser 102 having high power so as to efficiently obtain the SHG light. Further, it is necessary to use KNbO$_3$ instead of KTP as a nonlinear optical crystal. In particular, the SHG light can be efficiently obtained by performing a phase matching operation in which cut angles ($\theta$, $\phi$) of a KNbO$_3$ crystal are respectively set to $\theta = 90° \pm 1°$, $\phi \geq 40.6° \pm 5°$, or $\theta \geq 63.8° \pm 5°$, $\phi = 90° \pm 1°$.

In the above embodiment, the SHG element of a bulk internal resonator type as an example is used for the light source device 101. However, an SHG element of an external resonator type can be used for the light source device. In the case of the SHG element of an external resonator type, the operation of a semiconductor laser is similar to that of the above SHG element of an internal resonator type. LD light is directly converted to SHG light in the SHG element of an external resonator type. Accordingly, it is necessary to set the Q-factor of a resonator such that no LD light is excessively stored into the resonator and only a required amount of the SHG light is obtained.

In the above embodiment, the SHG light is used as an example, but the present invention is not limited to the SHG light. It is sufficient to arrange a wavelength converting section for emitting light having a short wavelength. Further, for example, the SHG element can be constructed such that SHG light, etc. are emitted by making a portion of LD light from the semiconductor laser 102 incident to the laser resonator 108, and a portion of the remaining portion of the LD light from the semiconductor laser 102 is not incident to the laser resonator 108, but is directly superposed on the SHG light by a beam splitter, etc.

Only a data writing operation of the optical memory medium 135 is described in the above operation of the optical pickup. However, similar to this writing operation, data can be erased and read out of the optical memory medium 135 by using respective intensity threshold values for erasing and reading the data and superposed light emitted from the light source device 101. In this case, no modulating operation of light is required in the erasing and reading operations.

As mentioned above, in accordance with a light source device of the present invention, LD light from a semiconductor laser capable of directly modulating light is superposed on light having a short wavelength from a wavelength converting section and is then emitted from the light source device. Accordingly, the light source device can emit a light beam modulated at a high speed and the diameter of a converged light spot can be reduced.

Further, when the above light source device is used as a light source of an optical pickup, it is possible to provide an optical pickup for increasing the capacity of an optical memory medium and having a high transfer rate.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical pickup using a light source device, said light source device comprising:
   a semiconductor laser capable of directly modulating light;
   a wavelength converting section for emitting light having a wavelength based on light from said semiconductor laser; and
   means for superposing said light from said semiconductor laser on said light emitted by said wavelength converting section having a wavelength based on said light from said semiconductor laser to thereby emit superposed light;
   said optical pickup being constructed such that a light beam emitted from said light source device is converged and incident to an optical memory medium.

2. An optical pickup as claimed in claim 1, wherein said wavelength converting section has a coating film for emitting said light having a wavelength based on said light from said semiconductor laser.

3. An optical pickup as claimed in claim 2, wherein said coating film has a higher reflectivity with respect to light having a wavelength longer than a given amount than to light having a wavelength which is shorter than said given amount.

4. An optical pickup as claimed in claim 1, wherein said light source device is used in said optical pickup at amounts less than the threshold values of light intensity for reading, writing and erasing operations of said optical memory medium.

5. A light source device comprising;
   a semiconductor laser for emitting a light beam and directly modulating said light beam; and
   a laser resonator for generating a basic wave in response to a first part of said emitted light beam, converting said basic wave into a higher harmonic wave while transmitting a second part of said emitted light beam, and for emitting said higher harmonic wave and said transmitted light beam superposed on each other.

6. A light source device according to claim 5, which further comprises a convergent optical means for converging said light beam emitted from said semiconductor laser onto said laser resonator.

7. A light source device according to claim 5, wherein said laser resonator comprises an optical element for generating said basic wave, a wavelength converting element for converting said basic wave into said higher harmonic wave, and an output mirror for outputting said higher harmonic wave and said transmitted light beam superposed on each other.

8. A light source device according to claim 7, wherein each of said optical element and said output mirror includes a coating film having a higher reflectivity to light having a wavelength longer than a given amount than to light having a wavelength shorter than said given amount.

9. An optical pickup apparatus having a light source device for converging a light beam emitted from a light source onto an optical memory medium, said light source device comprising:
   a semiconductor laser for emitting a light beam and directly modulating said light beam; and
   a laser resonator for generating a basic wave in response to a first part of said emitted light beam, converting said basic wave into a higher harmonic wave while transmitting a second part of said emitted light beam, and for emitting said higher harmonic wave and said transmitted light beam superposed on each other.

10. An optical pickup apparatus according to claim 9, in which said light source device further comprises a convergent optical means for converging said light beam emitted from said semiconductor laser onto said laser resonator.

11. An optical pickup apparatus according to claim 9, wherein said laser resonator comprises an optical element for generating said basic wave, a wavelength converting element for converting said basic wave into said higher harmonic wave, and an output mirror for outputting said higher harmonic wave and said transmitted light beam superposed on each other.

12. An optical pickup apparatus according to claim 11, wherein each of said optical element and said output mirror includes a coating film having a higher reflectivity to light having a wavelength longer than a given amount than to light having a wavelength shorter than said given amount.

* * * * *